United States Patent [19]
Morgan et al.

[11] 3,887,804
[45] June 3, 1975

[54] RADIOGRAPHIC TEST STAND

[75] Inventors: Tommie J. Morgan; George I. Coats; Richard W. Kisielewski; Charles K. Showalter, all of Rockville, Md.

[73] Assignee: The United States of America as represented by the Secretary of the Department of Health, Education & Welfare, Washington, D.C.

[22] Filed: Dec. 3, 1973

[21] Appl. No.: 420,977

[52] U.S. Cl. ............... 250/252; 250/312; 250/320; 250/444; 250/476; 250/491
[51] Int. Cl. .......................................... G03b 41/16
[58] Field of Search ........... 250/252, 312, 320, 323, 250/444, 445, 450, 451, 456, 470, 476, 521; 356/244, 246

[56] References Cited
UNITED STATES PATENTS

| | | |
|---|---|---|
| 2,258,593 | 10/1941 | Black .................................. 250/252 |
| 2,344,824 | 3/1944 | Landis et al. ....................... 250/312 |
| 2,680,199 | 6/1954 | Abel .................................... 250/445 |
| 3,175,695 | 3/1965 | Goodman et al. ................. 356/246 |
| 3,515,873 | 6/1970 | Higgins et al. ..................... 250/252 |
| 3,547,121 | 12/1970 | Cherry ................................ 250/312 |

*Primary Examiner*—James W. Lawrence
*Assistant Examiner*—C. E. Church
*Attorney, Agent, or Firm*—Browdy and Neimark

[57] ABSTRACT

A test stand for maintaining fixed geometry during X-ray imaging comprises a slide aperture for beam definition, a slide assembly having a wire grid for image sizing; and magnetic tape which secures metal strips for marking the edge of the light field relative to an X-ray field during imaging. The image is recorded on Linographic paper carried by the slide assembly.

13 Claims, 7 Drawing Figures

3,887,804

RADIOGRAPHIC TEST STAND

FIELD OF THE INVENTION

The present invention relates to a test stand for maintaining fixed geometry during X-ray imaging and, more particularly, to such a device which also permits beam definition, reproducibility, linearity, focal spat location image sizing and X-ray/light field comparisons.

BACKGROUND OF THE INVENTION

In order to achieve high precision and resolution with an X-ray apparatus, the X-ray apparatus must be properly aligned.

Prior art X-ray gauging and alignment devices utilize beam defining apertures for evaluating image distortion due to geometric misalignment. However, a major drawback with such devices is that they are relatively slow and inaccurate to use. Also, the prior art devices have no provision for carrying out several of the other X-ray test requirements, such as determining the X-ray field size, focal spot and beam quality.

SUMMARY OF THE INVENTION

The shortcomings of the prior art X-ray alignment devices are satisfactorily overcome by the present invention. It is, accordingly, an object of the present invention to thus overcome the defects of the prior art, such as indicated above.

Therefore, a primary object of the present invention is to provide an X-ray test stand which maintains fixed geometry easier and more accurately than previously known devices.

Another object is to provide an X-ray test stand which allows the compilation of several X-ray requirements in a single test system.

In furtherance of these and other objects, a principal feature of the present invention is an X-ray test stand which permits the compilation of several X-ray requirements such as linearity, reproducibility, beam quality, focal spot location, X-ray field alignment, minimum field size and X-ray field center — through the use of interchangeable parts.

Another feature of the present invention is a brass wire grid which yields image dimensions.

A further feature is the utilization of magnetic tape to maintain light field edge marker positions.

The X-ray test stand of the instant invention is characterized by a rectangular open-ended Lucite (polymethylmethacrylate) frame. The frame comprises several slots and push button lock connectors. The slots receive a slide assembly for evaluating several parameters of the X-ray equipment. The push button lock connectors are used for mounting an ion chamber in the interior of the frame. The test stand is further characterized by a spacer assembly which is positively positioned on top of the Lucite frame.

BRIEF DESCRIPTION OF THE DRAWING

For a better understanding of the invention a possible embodiment thereof will now be described with reference to the attached drawing, it being understood that this embodiment is to be intended as merely exemplary anad in no way limitative.

DETAILED DESCRIPTION

Figure 1:
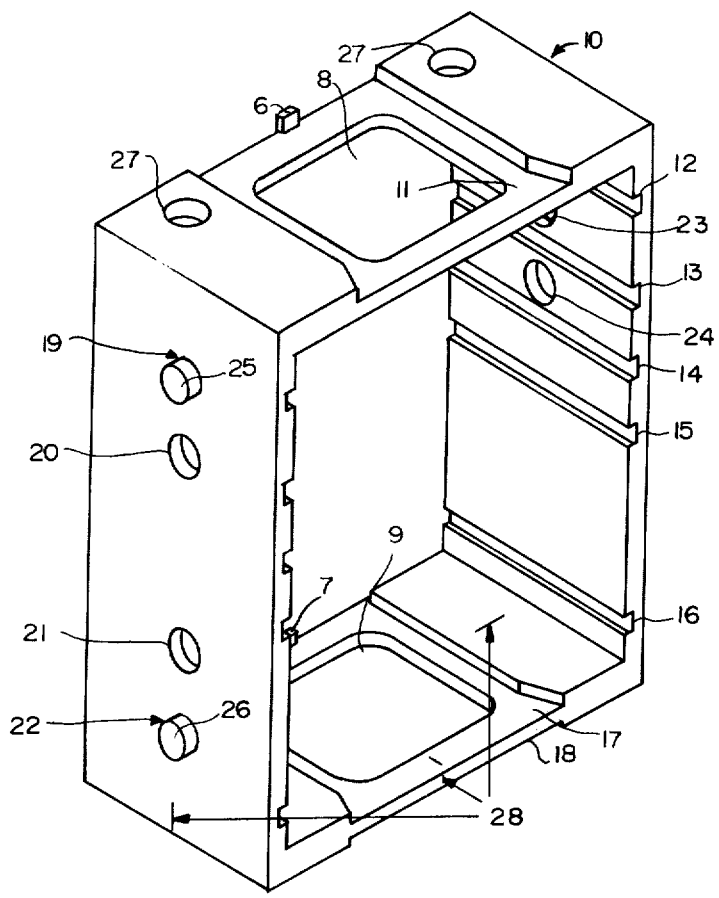
FIG. 1 is a perspective view of one embodiment of the test stand.

Referring to FIG. 1, the test stand is a substantially rectangular open-sided frame 10 preferably made of a plastic such as polymethylmethacrylate (Lucite). The frame includes several slots 11–18 and aperture-like chamber mounts 19–24. The bottom of the stand is equipped with four soft rubber feet (not shown) to prevent the sliding of the test stand when used on tabletops.

Slot 11, which is on top of the test stand, is designed to hold a slide 39 (see FIG. 3) which preferably has one surface of an X-ray absorbant material such as lead and one surface of a rigid plastic such as Lucite. The slide 39 has an opening in the center, which may be about 2 × 2 inches, hereinafter referred to as the beam defining aperture. X-ray absorbers 40 (see FIG. 3) preferably of aluminum sheet, which are used in half-value layer evaluation, may be inserted on top of the beam defining aperture when using above tabletop radiation sources. Slot 11 is bordered by spacer mounts 27 which are located on the top face of the test stand adjacent to slot 11. An aperture 8, substantially larger than the 2 inch opening of the beam defining aperture, is centrally located in slot 11.

Slots 12–16 are designed to receive a slide assembly 29 (see FIG. 2) which may be inserted face up or face down in any of the slots, the desired position being dictated by the type of evaluation being conducted. The bottom face of the test stand includes two slots 17 and 18, and an aperture 9, similar to aperture 8, which communicates between slots 17 and 18. If the source which is being evaluated is below the tabletop, slots 17 and 18 are used to receive assorted aluminum absorbers for half-value layer measurement and the beam defining aperture slide 39 respectively (see FIG. 5). Accordingly, when the source is below the table top, the aluminum absorbers are conventionally placed in slot 17 and the beam defining aperture slide 39 is positioned in slot 18. The lead surface of the beam defining aperture slide 39 is always facing toward the X-ray source when inserted into either slot. The slide 39 is also designed such that there is no orientation required other than simply to insert the slide into the slot. Slide stops 6 and 7 located at one of the open ends of slots 11 and 17, position the beam defining aperture and aluminum absorber over apertures 8 and 9, respectively.

Figure 3:
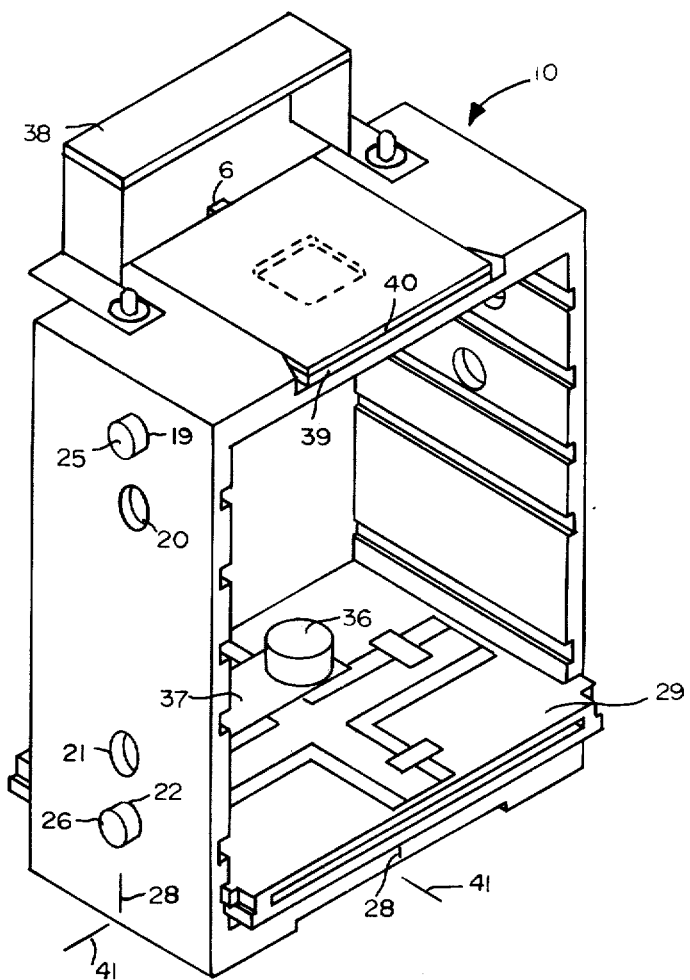
FIG. 3 is a perspective view of one embodiment of the test stand and slide assembly equipped for evaluating an above tabletop source with the spacer assembly out of the path of the beam.

Lock mounts 19 and 22 receive push button locks 25 and 26, respectively, which are used for the mounting of an ion chamber 36 carried by a right angle bracket 37 (see FIG. 3). The lock and guide assembly for the ion chamber mounts are such that the ion chamber can be mounted in either of two lock mount positions. One lock mount 19 is located near the top on one side of the test stand, while mount 22 is on the same side near the bottom of the test stand. At each mount location the ion chamber bracket can be mounted with the chamber facing either upward or downward. The desired position is dictated by the type of equipment on which an evaluation is being conducted. Center lines 28 are provided on the bottom portion of the test stand for accurate positioning atop a radiographic table.

A tripod and attaching clamp may be furnished with each device. The tripod is for positioning the test stand assembly when evaluating equipment other than conventional fluoroscopic and radiographic X-ray sources. By attaching the test stand in an upright position to the tripod, with a clamp across the bottom aperture of the test stand, the test stand can be adjusted vertically to a height of about 60 inches above the surface on which the tripod is resting. If a horizontal mount is needed, the test stand may be clamped to the tripod at the side of the test stand. If the test stand is mounted in a horizontal position it may be necessary to use a small clamp to hold the lead-Lucite beam defining aperture in position.

Figure 2:
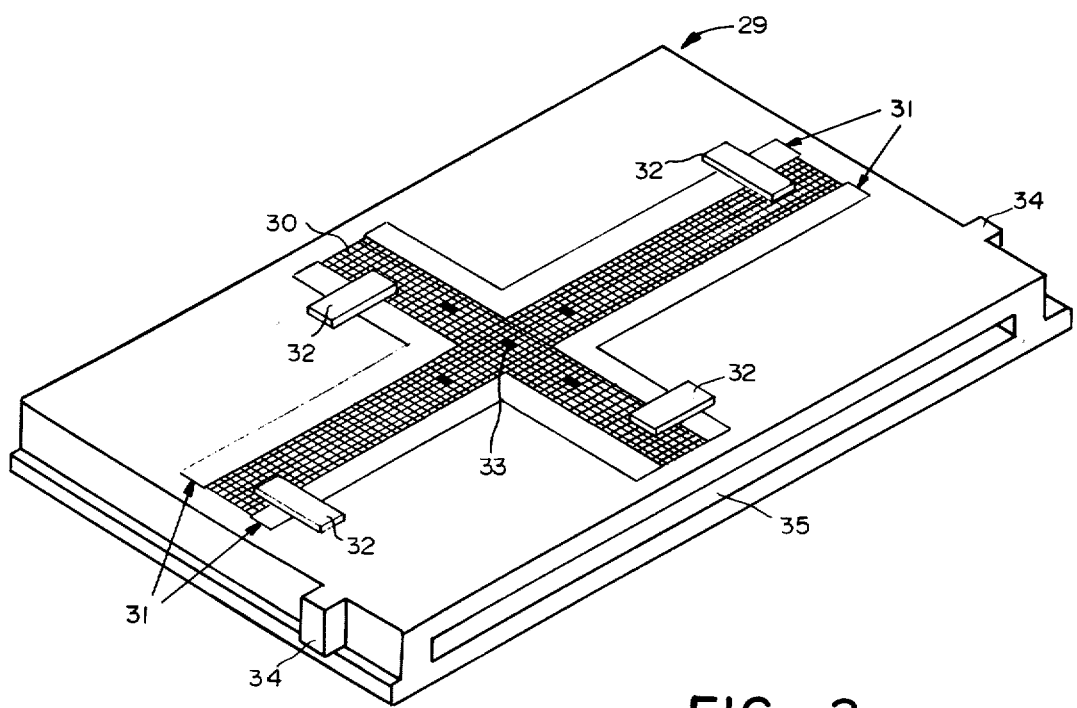
FIG. 2 is a perspective view of the slide assembly.

Referring now to FIG. 2, the slide assembly 29 is designed for use in evaluating several parameters of X-ray equipment. It includes wire mesh 30 with 0.1 inch spacings which allow direct reading of the size of the image formed on the Linographic paper. The boundaries surrounding the wire mesh 30 are strips of magnetic tape 31. This allows infinite positionability of ½ × 1 inch metal strip markers 32 parallel to and coinciding with the edge of the light field. The metal strips 32 are positioned such that the body of the metal strip is in the illuminated area, with the outer edge of the metal strip corresponding to the edge of the light field. A solder filled square reference marker 33 is located at the center of the slide assembly on the wire mesh, while additional reference markers are provided at 1 inch intervals along the wire mesh.

Slide stops 34 are provided on either side of the slide assembly 29. The slide stops 34, which engage the sides of the test stand when the slide assembly 29 is inserted in an appropriate slot (see FIG. 3), are positioned such that the slide assembly 29 will be accurately aligned with the beam defining apertures.

The body of the slide assembly 29 is hollowed out to form a cassette slot 35. The cassette slot 35 receives a cassette containing a sheet of light-sensitive paper which has X-ray sensitivity such as Linographic paper Type 1895 manufactured by Eastman Kodak Co. on which the image is formed.

Figure 4:
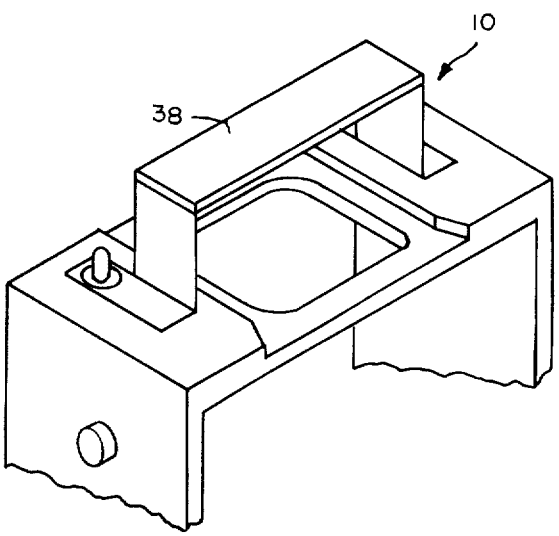
FIG. 4 is a perspective view of the test stand with the spacer assembly mounted in the path of the beam.

Referring now to FIG. 3, there is shown a test stand equipped with a one-inch ion chamber 36, which is mounted on right angle bracket 37 preferably of aluminum. The lock and guide assembly for the ion chamber mounts are such that the ion chamber 36 can be mounted in either lock mount 19 or lock mount 22, as described hereinabove. The test stand is also equipped with a spacer assembly 38 which is positively positioned in the spacer mounts (numeral 27 in FIG. 1) atop the test stand. The spacer assembly 38 may be positioned in alignment with the beam defining aperture (see FIG. 4) or out of alignment with the beam defining aperture (see FIG. 3) as desired.

In FIG. 3, the test stand 10 is shown set up for an above-the-tabletop source. The beam defining aperture slide 39 and aluminum asorber 40 are shown in position in slot 11 (see FIG. 1), as described hereinabove. The ion chamber 36, which is facing up, is mounted in mount position 22. The slide assembly 29 is in position in slot 16 (see FIG. 1). Also, the test stand centerlines 28 are shown in alignment with the tabletop centerlines 41.

Figure 5:
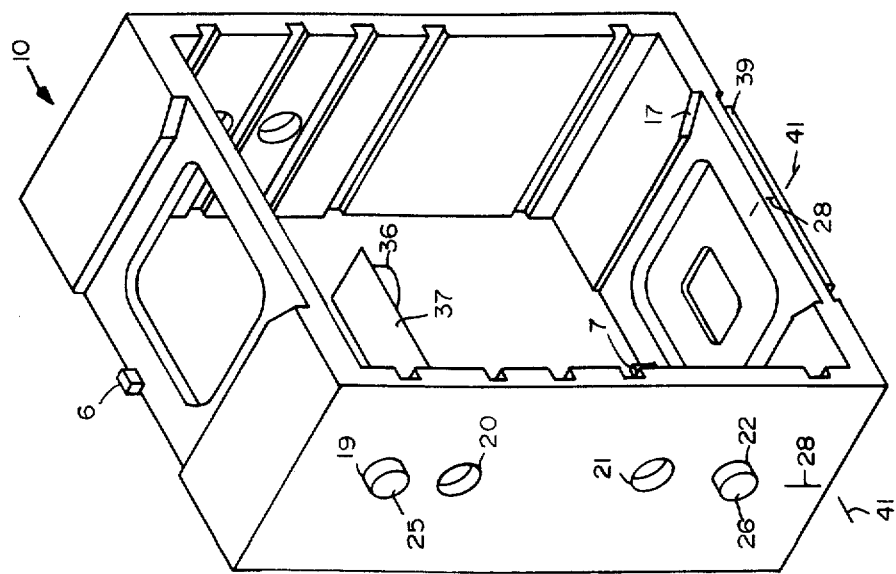
FIG. 5 is a perspective view of the test stand equipped for evaluating a below tabletop source.

Referring now to FIG. 5, the test stand 10 is shown set up for a below-the-tabletop source. The beam defining aperture slide 39 is in position in slot 18 (see FIG. 1), while the aluminum absorber (not shown) may be positioned in slot 17. The ion chamber 36, which is facing downwardly, is mounted in mount position 19.

The general set up procedure is as follows:

1. The test stand 10 is placed on the tabletop of the radiographic installation.
2. The test stand 10 is centered longitudinally on the table by positioning the red centering indicators 28 of the test stand over the centerline mark 41 of the radiographic table.
3. The test stand 10 is then moved along the centerline until it is centered laterally over the under table image receptor by one of two methods: (a) turning the Bucky light of the source assembly on and positioning the test stand such that the lateral center marks of the stand align with the Bucky light; (b) positioning the red center marks of the test stand over the lateral line on the tabletop. This lateral line on the tabletop, if present, indicates the center of the under table image receptor.
4. The spacer 38 is placed on the top of the test stand and attached using pushbutton locks. The spacer should be positioned so as not to intersect the primary beam (as seen in FIG. 3).
5. The source assembly is centered over the test stand 10 with the aid of the centering marks in the collimator light, lowered until the face of the beam limiting device is in contact with the spacer assembly 38, and locked into position.
6. The beam defining aperture slide 39 is inserted in slot 11 of the test stand 10, leaded side facing upward.
7. The slide assembly 29 is placed in slot 16 of the test stand.
8. A cassette containing a sheet of Linographic paper is inserted into slit 35 of slide assembly 29.
9. The 1 inch ion chamber 37 is attached in mount position 22 in an upward facing position.

The test stand is now in the configuration shown in FIG. 3.

In operation, the following procedure for collecting reproducibility data may be used:

1. The first six steps of the general set-up procedure are carried out.
2. The 1 inch ion chamber 36 is mounted in mount position 22 with the ion chamber in the upward facing position. An electrometer survey instrument for measuring the current detected by the ion chamber is attached to the ion chamber via a long cable.
3. An exposure is made, and the reading on the survey instrument recorded.
4. The exposures are repeated until 3 exposures have been recorded.
5. The coefficient of variation, C is calculated:

$$C = \frac{1}{\overline{X}} \left[ \sum_{i=1}^{n} \frac{(X_i - \overline{X})^2}{n-1} \right]^{1/2}$$

wherein $\bar{X}$ = is the average of the survey instrument readings, $n$ = is the number of readings (here 3)

$X_i$ = is the i survey instrument reading.

In operation, the following procedure for collecting linearity data may be used:

1. The first six steps of the general set-up procedure are carried out.
2. The collimator of the source assembly is adjusted so that the radiation field is made to exceed the 2 inch aperture of the beam defining aperture, but not the dimensions of the lead sheet in which the aperture was cut.
3. Technique factors are selected such that the milliamps (mA) may be adjusted by a factor of 2 at a fixed kilovoltage peak (kVp).
4. Three exposures are made and recorded at a particular mA setting, then the mA setting is changed and three more exposures made and recorded.
5. The linearity is calculated as:

$$(\bar{X}_1 - \bar{X}_2)/(\bar{X}_1 + \bar{X}_2) \leq 0.1$$

where $\bar{X}_1$ and $\bar{X}_2$ are the average milliroentgen (mR)/mA values obtained at tube current settings 1 and 2.

In operation, the following procedure for making beam quality determinations may be used:

1. The first six steps of the general set-up procedure are carried out.
2. The collimator of the source assembly is adjusted so that the radiation field is made to exceed the 2 inch aperture of the beam defining aperture, but not the dimensions of the lead sheet in which the aperture was cut.
3. The 1 inch ion chamber is mounted in mount position 22 with the ion chamber in the upward facing position. The survey instrument is attached to the ion chamber via a long cable.
4. With no absorbers in the beam, an exposure is made and the reading on the survey meter is recorded.
5. Aluminum absorbers are added in slot 11 of the test stand and exposures and readings are continued until the required amount of aluminum is reached.
6. The half-value layer is determined graphically by plotting the meter readings versus the aluminum thickness and reading from the graph that amount of aluminum which would halve the original (no absorber) reading.

In operation, the following procedure for locating the focal spot may be used:

1. The first eight steps of the general set-up procedure are carried out.
2. The collimator of the source assembly is adjusted so that the radiation field is made to exceed the 2 inch aperture of the beam defining aperture, but not the dimensions of the lead sheet in which the aperture was cut.
3. The test stand is now ready for an exposure to determine the focal spot location.
4. Since the distance between the beam defining aperture and the cassette is known, and the dimensions of the x-ray field at the cassette can be determined on development of the image receptor contained in the cassette, calculations based on triangulation may be performed to determine the focal spot.

In operation, the following procedure for determining the X-ray/light field alignment may be used:

1. The first five steps of the general set-up procedure are carried out.
2. The slide assembly 29 containing a loaded cassette is inserted into slot 16 of the test stand.
3. The collimation of the light field should be such that no part of the light field intersects any portion of the top of the test stand. The light field must be adjusted such that the field will be smaller than the image receptor (Linographic paper) contained in the cassette.
4. Position the outer edge of each metal strip 32 to correspond with each side of the light field. One end of the metal strip should be over the center of the wire mesh.
5. An exposure is made.
6. For determination of misalignment, the edges of the X-ray field are compared to the edges of the light field as defined by the outer edges of the cross-bars. The distances between the two fields are measured for each side of the rectangular fields. The measured distances of opposite sides of the rectangles are arithmetically summed to yield misalignment in the two directions.
7. The allowable misalignment at various distances is 2 percent source to image distance (SID).

In operation, the following procedure for determining the minimum field size may be used:

1. The first five steps of the general set-up procedure are carried out.
2. The beam limiting device is adjusted to yield the minimum X-ray field size possible.
3. The slide assembly 29 is inserted into slot 16 of the test strand.
4. A cassette containing a sheet of Linographic paper is inserted into the slide assembly 29.
5. An exposure is made and the image of the field size is measured.

In operation, the following procedure for determining the focal spot to under table image receptor plane distance may be used:

1. The first eight steps of the general set-up procedure are carried out.
2. The collimator of the source assembly is adjusted so that the radiation field is made to exceed the 2 inch aperture of the beam defining aperture, but not the dimensions of the lead sheet in which the aperture was cut.
3. An exposure is made. The size of the image at the image receptor is measured.
4. Knowing the focal spot location, the size of the image in the tray, and the size of the hole in the beam defining aperture, triangulation calculations are made to determine the distance from the focal spot to the tray and, hence, the distance from the tabletop to the tray.

In operation, the following procedure for making under table image receptor size comparisons and for determining the X-ray field size may be used:

1. The first five steps of the general set-up procedure are carried out.
2. In slot 15 of the test stand, insert the slide assembly 29 containing a sheet of Linographic paper in a cassette.
3. For equipment with automatic collimation one must place an empty cassette in the under table image receptor (UTIR), whereas, for equipment with manual collimation, one has to adjust the field size to 8 inches × 10 inches for 40 inches SID.

4. An exposure is made.

5. The size of the X-ray field image on the Linographic paper is determined.

Figure 6:
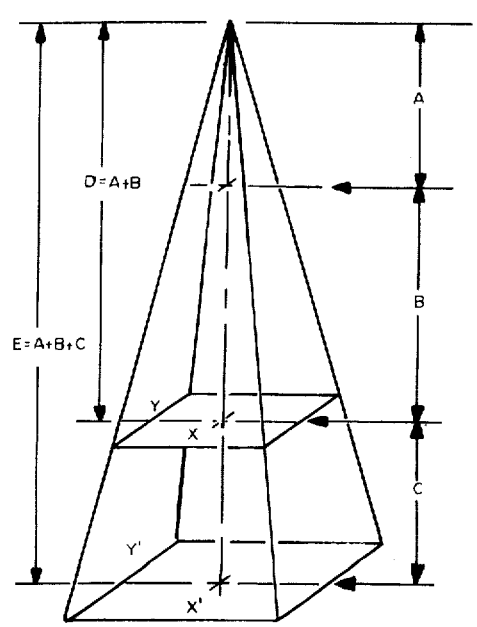
FIG. 6 is a perspective diagram showing one embodiment of the X-ray field size geometry.

6. The field size is corrected to the appropriate source-to-under table image receptor distance by use of the following procedures. Referring now to FIG. 6, the size of the X-ray field image made on the Linographic paper is determined and recorded. The distance A from the source to the upper surface of the spacer is added to the distance B from the upper surface of the spacer to the film plane. The distance E is determined from the "Under Table Image Receptor Plane Distance Determination" procedures immediately hereinabove (40 inches for Manual Operation Beam Limiting Devices). Distance C, which equals E−(A + B), is from the film plane to the UTIR plane. Therefore the following equation may be used to determine the size of the X-ray field at the Under Table Image Receptor Plane (Bucky tray).

$$D/E = X/X' = Y/Y'$$

where: $D = A + B$;

$X$ and $Y$ are the coordinate values of the image in the film plane; and $X'$ and $Y'$ are the coordinate values of the image in the UTIR plane.

In operation, the following procedure for making X-ray field center and under table image receptor center comparisons may be used:

1. The first five steps of the general set-up procedure are carried out.

2. In the Bucky tray (under table image receptor assembly) is placed a cassette containing a sheet of Linographic paper. The cassette has the center marked by a centering marker. The cassette is centered in the tray and locked in position.

3. The X-ray beam must be reduced to a size smaller than the under table image receptor.

4. An exposure is made.

5. The method of calculation follows.

a. To determine the corners of the image recorded on the Linographic paper, as accurately as possible, two points are located on each of the four sides of the image. Through the two points on each side of the image, a straight line is drawn. These four lines when extended intersect making a rectangle which is a close approximation of the actual X-ray field.

b. Diagonals are then drawn across the rectangular figure determined above. Where the two diagonals cross is assumed to be the center of the X-ray field.

c. The cassette which was used in the under table image receptor has a centering mark on it. This image, which is recorded on the paper, represents the center of the image receptor. The distance from the cassette center image to the point where the diagonals cross is measured and recorded as the linear displacement or misalignment of the centers of the image receptor and X-ray field.

Figure 7:
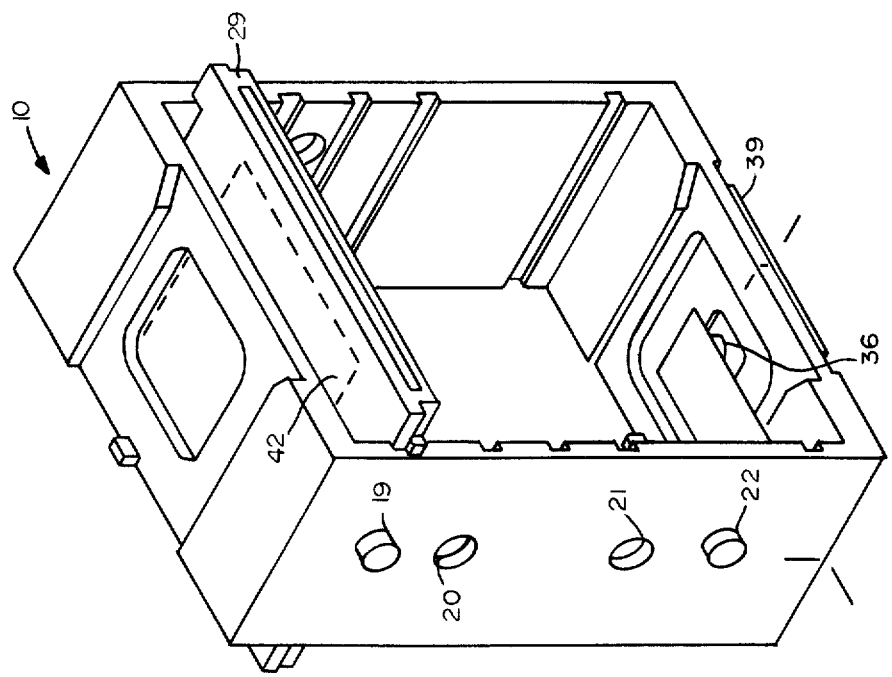
FIG. 7 is a perspective view of one embodiment of the test stand and slide assembly equipped for evaluating a below tabletop fluoroscopic source.

In operation, the following general procedure for evaluation of a fluoroscopic X-ray unit may be used:

1. Referring to FIG. 7, the test stand 10 is placed on the tabletop and the image receptor is approximately centered over the test stand. The slide assembly 29 (wire mesh down) is inserted in slot 12 and a brass attenuation block 42 (primary barrier) is positioned above the slide assembly by laying it directly on the slide assembly or by placing it on top of the test stand. The fluoroscopic source is activated and the exact centering of the image receptor assembly is performed by viewing the image of the wire grid 30 on the slide assembly 29 and positioning this image on the center of the visible area. The image receptor is then lowered into firm contact with test assembly and locked into position. The beam defining aperture slide 39 is inserted in slot 18 of the test stand. The ionization chamber 36 is placed in a face down position in mount position 22. the ionization chamber 36 is then connected via a long cable to the survey instrument. Linographic paper in a cassette is inserted in the slide assembly 29 which is in slot 12 of the test stand. survey 2. The tabletop exposure rate is determined by use of the ionization chamber and sruvey instrument. The kVp, mA and exposure rate are recorded on a data sheet.

3. The ionization chamber 36 is moved from mount position 22 to mount position 19. An exposure is made to determine the reading with zero absorber in the beam for beam quality determination. Aluminum filters are inserted in slot 17, exposures are made and recorded by the corresponding values of added filtration. This procedure is terminated when the output intensity has been reduced to one-half or less of its original value.

4. If a minimum of 100 mAs has been delivered to the Linographic paper it is then removed, developed, and the image size recorded. If a minimum of 100 mAs has not been delivered to the Linographic paper, additional exposures are made until the minimum value is reached.

5. The 1 inch ionization chamber is removed from the test stand, disconnected from the survey instrument and a 100 cm$^2$ ionization chamber is attached to the survey instrument and positioned above the primary barrier. Exposures are made to evaluate radiation transmitted through the primary barrier. The kVp, mA, and exposure rate are then recorded.

6. The slide assembly is removed from slot 12 and inserted in slot 15 of the test stand, again with the wire screen facing downward. Confirm that the brass attenuation block is intersecting the primary beam. A sheet of Linographic paper in a cassette is inserted in the slide assembly. The beam defining aperture is removed from slot 18 of the test stand. During the exposure of Linographic paper, the dimensions of the visible field observed on the fluoroscopic image receptor are recorded. on a data sheet. These dimensions are determined by the wire grid image. After delivering 100 mAs to the linographic paper, it is developed and the size of the X-ray field image determined and recorded on the data sheet. The differences of the length and width of the two images represent the misalignment of the X-ray field and fluoroscopic image receptor for the two dimensions evaluated.

In operation, the following procedure for determining the fluoroscopic tabletop exposure rate may be used:

1. The test stand is placed on the tabletop and, with a brass attenuation block in slot 12, the image receptor is centered over the test stand, lowered and locked into position.

2. Into mount position 22 is inserted the modified 1 inch ionization chamber in a face down position.

3. The beam defining aperture slide 39 is placed in slot 18, leaded side up.

4. The ionization chamber is connected via a long cable to the survey instrument.

5. The beam limiting device is adjusted so as to exceed the 2 × 2 inches opening, while not exceeding the size of the beam defining aperture slide. The exposure rate and technique factors are recorded on the data sheet.

In operation, the following procedure for determining the fluoroscopic transmission through the primary barrier may be used:

1. The test stand is placed on the tabletop and the slide assembly 29 is inserted in slot 15. The brass attenuation block is above the slide assembly in slot 14 or is placed directly on the slide assembly.

2. The image receptor is approximately centered over the test stand, then the fluoroscopic source is activated and exact centering is performed by viewing the image of the wire grid on the slide assembly and positioning this image in the center of the visible area. The image receptor is then lowered into firm contact with the test assembly and locked into position.

3. The 100 cm² area ionization chamber is connected to the survey instrument by a long cable.

4. The 100 cm² area ionization chamber is positioned above the primary barrier. The area around and directly above the primary barrier should be surveyed during operation of the fluoroscopic unit. Technique factors and maximum exposure rate are recorded on the data sheet.

5. The allowable transmission through the primary barrier is 2 mR/hr per R/min at the tabletop.

In operation, the following procedure for determining the fluoroscopic beam quality may be used.

1. the test stand is placed on the tabletop and, with the brass attenuation block in slot 14, the image receptor is centered over the test stand, lowered and locked.

2. The beam defining aperture is placed in slot 18, leaded side up.

3. The 1 inch ionization chamber is positioned in a face down position in mount position 19. The chamber is connected to the survey instrument via a long cord.

4. The technique factors used in this evaluation are recorded on the data sheet. An exposure is made and the output of the survey instrument is recorded on the data sheet.

5. Aluminum absorbers are inserted in slot 17, exposures are made and recorded by the corresponding value of added filtration. This procedure is terminated when the output intensity has been reduced to one half or less of its original value.

6. The half-value layer is determined graphically by plotting instrument readings versus the aluminum thickness and reading from the graph that amount of aluminum which would halve the original (no absorber) reading.

In operation, the following procedure for locating the fluoroscopic focal spot may be used:

1. The test stand is placed on the tabletop in a position such that the image receptor can be placed over the test stand.

2. The beam defining aperture is placed in slot 18 of the test stand.

3. The slide assembly is inserted in slot 12 and a brass attenuation block is positioned on the slide assembly so as to intersect the primary beam.

4. The image receptor is centered over the test stand by observing the image of the beam defining aperture. The image receptor is lowered into firm contact, then locked into position.

5. The beam limiting device is adjusted to exceed the 2 inches × 2 inches opening while not exceeding the beam defining aperture slide 39. Linographic paper is placed in a cassette and inserted in the slide assembly 29.

6. An exposure is made, and the Linographic paper in the cassette is removed and developed. The image size of the 2 inch aperture is measured and recorded on the data sheet.

7. Knowing the size of the image and the distance from the tabletop to slot 12, triangulation calculations can be made to determine the focal spot.

In operation, the following procedure for determining the alignment of the X-ray field and the fluoroscopic image receptor may be used:

1. The test stand is placed on the tabletop with the brass attenuation block in slot 12.

2. The slide assembly 29 is placed in slot 15 with the wire screen facing downward.

3. The image receptor is centered over the test stand, lowered into contact, and locked into position.

4. A loaded cassette is placed in the slide assembly 29.

5. During the exposure of the Linographic paper, the dimensions of the visible field observed on fluoroscopic image receptor are recorded on the data sheet. These dimensions are determined by use of the wire grid image.

6. The size of the X-ray field image on the Linographic paper is determined and recorded on the data sheet.

7. The differences in the length and the width of the two images represent the misalignment of the X-ray field and the fluoroscopic image, receptor for the two dimensions evaluated. The misalignment in either dimension is 3% SID and the sum of the misalignment in both dimensions cannot exceed 4% SID.

It will be obvious to those skilled in the art that various changes may be made without departing from the scope of the invention and the invention is not to be considered limited to what is shown in the drawings and described in the specification.

What is claimed is:

1. A test stand for maintaining fixed geometry during X-ray imaging, comprising:

a substantially rectangular frame open at the front and back having substantially aligned first and second apertures in two opposing sides, first slide receiving means associated with each of said apertures for receiving and positioning a slide assembly over said apertures, and a plurality of second slide receiving means in two opposing sides of said frame other than those sides having said apertures for receiving and positioning a slide assembly parallel to and between said apertures at various predetermined positions between said apertures.

2. A test stand in accordance with claim 1 wherein said frame further includes a plurality of mounting means on the sides of said frame having said second slide receiving means for positioning an ion chamber at predetermined positions between said apertures.

3. A test stand in accordance with claim 2 further including an ion chamber and an ion chamber mount connected thereto, said ion chamber mount being positioned in one of said mounting means.

4. A test stand in accordance with claim 1 wherein said frame further includes spacer mounting means adjacent said first aperture for positioning a means for supporting an X-ray source.

5. A test stand in accordance with claim 4 further including a spacer means, mounted on said spacer mount means, for supporting the X-ray source a predetermined distance from said first aperture, said spacer means being positioned in alignment with said first and second apertures.

6. A test stand in accordance with claim 4 further including spacer means, mounted on said spacer mount means, for supporting the X-ray source a predetermined distance from said first aperture, said spacer means being positioned out of alignment with said first and second apertures.

7. A test stand in accordance with claim 1 further including a first slide assembly, positioned in one of said first slide receiving means, having an aperture therein, not larger than said first and second apertures of said frame, for radiation beam definition.

8. A test stand in accordance with claim 7 wherein said first slide assembly is made of lead and further includes means for holding the lead slide rigid.

9. A test stand in accordance with claim 8 wherein said first slide assembly further includes a brass attenuation block covering the aperture therein.

10. The test stand of claim 1 further comprising centering means located on said frame for properly aligning the test stand with the X-ray source.

11. A test stand in accordance with claim 1 further including a second slide assembly positioned in one of said second slide receiving means having first and second faces forming a slot means therebetween for receiving light-sensitive paper sensitive to X-rays, and having grid means on one of said faces for image sizing, adherent means adjacent said grid means for holding marker means in position when placed thereon, and metal marker means adhereable to said adherent means for marking predetermined areas of said grid means.

12. A test stand in accordance with claim 11 wherein said grid means comprises a wire grid and said adherent means comprises magnetic tape.

13. The test stand of claim 5 wherein said second slide assembly includes reference markers located at intervals along said grid means.

* * * * *